(12) United States Patent
Panvalkar et al.

(10) Patent No.: US 7,539,218 B2
(45) Date of Patent: May 26, 2009

(54) MEDIA PROCESSING ENGINE FRAMEWORK

(75) Inventors: Jaya Panvalkar, Pune (IN); Vindhya Tallamraju, Pune (IN); Hatwankar Swapna, Pune (IN); Nair Bijay, Pune (IN); Bhat Himanshu, Pune (IN)

(73) Assignee: NVIDIA Corporation, Santa Clara, CA (US)

( * ) Notice: Subject to any disclaimer, the term of this patent is extended or adjusted under 35 U.S.C. 154(b) by 695 days.

(21) Appl. No.: 11/070,747

(22) Filed: Mar. 2, 2005

(65) Prior Publication Data

US 2005/0207453 A1    Sep. 22, 2005

(51) Int. Cl.
*H04J 3/06* (2006.01)

(52) U.S. Cl. ..................................... 370/509

(58) Field of Classification Search ............ 370/395.64; 709/230, 231
See application file for complete search history.

(56) References Cited

U.S. PATENT DOCUMENTS 6,141,490 A * 10/2000 Oishi et al. ................... 386/98
2004/0260823 A1* 12/2004 Tiwari et al. ................. 709/230

* cited by examiner

*Primary Examiner*—Chirag G Shah
*Assistant Examiner*—Otis L Thompson, Jr.
(74) *Attorney, Agent, or Firm*—Zilka-Kotab, PC (57) ABSTRACT

A method is described for synchronously processing and rendering digitized media data streams where each data stream is made up of a sequence of samples. The described method includes processing each data stream in a single task. The method includes the generating the timing signals for different data streams from a single operating system timer and further processing the media in the data stream synchronously in one task using this timing signal.

12 Claims, 9 Drawing Sheets

MEDIA PROCESSING ENGINE FRAMEWORK

FIELD OF INVENTION

The invention relates to the low memory and low processing power synchronization method for different media types in a single task.

This invention relates to a method of synchronously processing data streams.

In particular this invention relates to a method of synchronously processing data streams, for synchronously processing and rendering digitized media data streams where each data stream is made up of a sequence of samples.

Still particularly, the method includes processing each data stream in a single task.

BACKGROUND OF THE INVENTION

A multimedia framework is a system in which, a media streams originated from source components such as a storage system or the devices such as camera and microphone, are passed through compression or decompression components, and are sent to the sink components such as a storage system or devices such as speaker and/or display device in real-time. The multimedia framework also presents media streams together in a synchronized way, for example audio and video media are to be rendered together in a synchronized way.

In this invention the method to process the media streams in a synchronous manner is described. The general ways to achieve this synchronization are providing hardware timers for each source and sink components and assigning the media timestamps to each media samples or to have a hardware times associated with every component which are synchronized with each other so that they produce or render media samples in a synchronized way. Also the each media type is processed in an independent task. Some of the prior arts in this field are given below.

Figure 1:
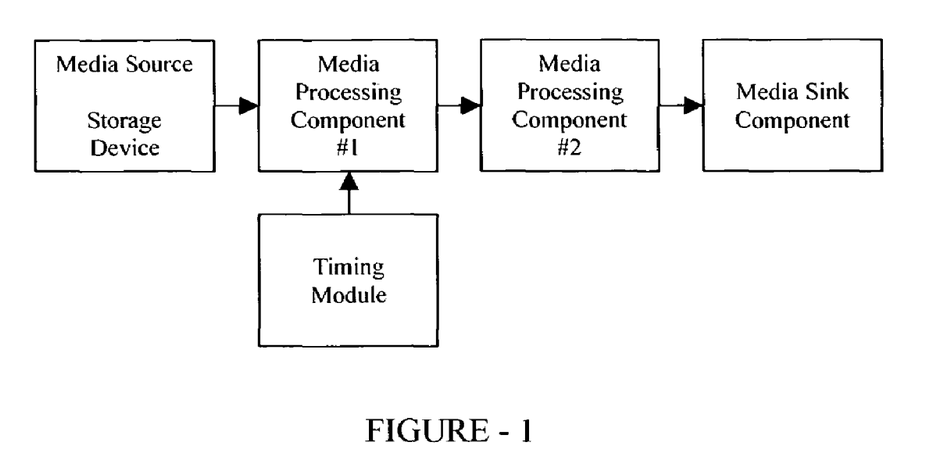
FIG. 1 Illustrates a prior art framework where one timing module is required for each media-processing component.

A multi media framework system such as in FIG. 1 of the accompanying drawings, describes a prior art method where data processing rate of only one upstream component [component 1] from a media source possibly from a storage device to a media sink component, such as an LCD or a file system is controlled by a clock source [the timing module]. The [component 2] depends upon the timing information received in the data stream from component 1. The disadvantage of this method is that there is no feedback from the final element/device i.e. the [media sink component], which actually outputs data. Also there can be an overall drift in processing times in this kind of system.

Figure 2:
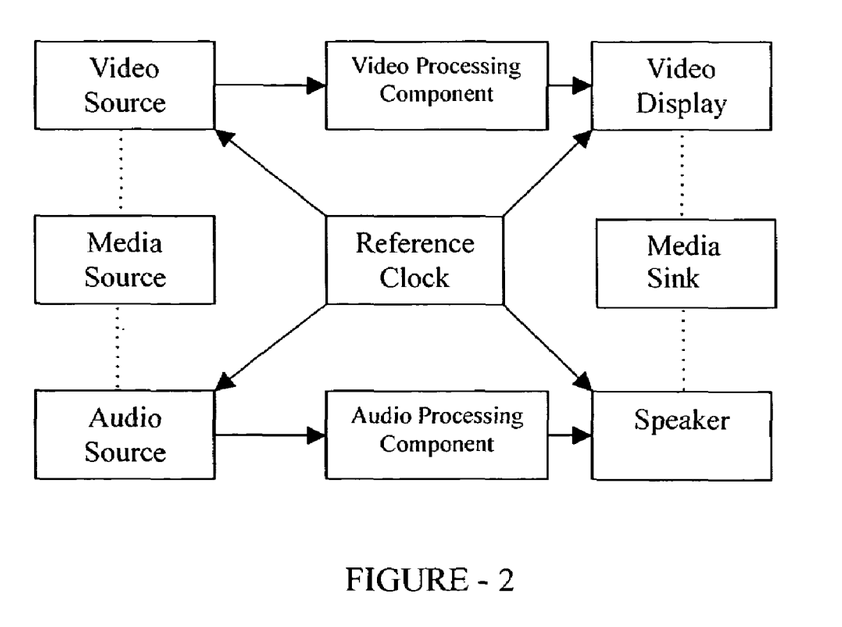
FIG. 2 Illustrates a prior art framework where one reference clock is given to source and sink components.

An alternative framework system is described in FIG. 2 of the accompanying drawings. In the block diagram of this figure, data streams are obtained from media sources such as the audio and video source shown in the figure. Audio and video data is processed in the audio and video processing components respectively to render in media sinks such as the video display and the spealer. A single clock [reference clock] source is used to control different modules in the system such as the audio source, the video source the speaker and the video display. These blocks query the central reference clock source for the current system time and take decisions periodically. This leads to excessive overheads in the system.

U.S. Pat. No. 6,049,769 discloses a system useful in video editing for synchronizing digital audio to digital video. This method employs a hardware setup for acquiring audio-video data from multiple channels and synchronizing it while editing process. The system employs multiple clocks derived from a common hardware clock.

U.S. Pat. No. 6,697,930 discloses a multi-standard video decoder and decompression method wherein hardware clocks are used for synchronization, each codec has a clock, which is synchronized, with the master clock on a complete hardware system.

Both the above stated systems are implemented in hardware, so in spite of having higher accuracy, these methods lack flexibility and are complex in nature.

U.S. Pat. No. 6,546,190 discloses a synchronization algorithm of multiple media streams, wherein the time codes are recorded periodically on the medium and a relationship is established between each element of the medium and absolute reference time exists. Here recorded time codes represent the absolute time and sent with the media samples.

U.S. Pat. No. 6,320,882 discloses a method for handling multiple real-time service events, wherein a periodic timer tick used to process the real time events. The events are generated by adding the global timer value to the queue time period and stored on the respective queue in sorted order. The events are queued and processed till the global timer value is less than the event in the queue.

U.S. Pat. Nos. 5,553,222, 5,596,696 disclose a multimedia synchronization system where, synchronization in different multimedia objects is provided using clock objects associated with each of the multimedia object. Clock objects are software timers that can support delay by blocking a thread for some time, set and get time, wakeups using inter process communication methods. Synchronization between two clocks is provided by determining the offset between the two clocks and by comparing the rate of the two clocks.

U.S. Pat. No. 5,661,665 discloses a multi-media synchronization method, which calculates a media presentation time using a common clock reference. This presentation time is attached to every media sample. All the processing objects including the sink component uses the clock to render data synchronously.

The aforesaid patents associate a clock with each processing module as well as the device, the synchronization procedures are complex in nature, use more OS resources including more memory.

U.S. Pat. No. 6,564,382 describes a method which plays a set of multimedia tasks by registering the tasks with a common scheduler, and the scheduler is adapted to control the execution of the tasks. However this method implements audio decoding, video decoding and rendering in separate tasks, which increases the OS kernel objects and task switching between these tasks.

An object of this invention is to provide a framework system, which supports multiple sessions with different timing requirement and processing the data stream in a single task.

Accordingly, those concerned with the design, development and use of audio-video synchronization in mobile environments have long recognized a need for improved methods providing enhanced flexibility, performance and low OS and system requirements. The present invention clearly fulfills all these needs.

SUMMARY OF THE INVENTION

The invention described here provides a method and apparatus to synchronize different media types in a single task. The method envisaged in accordance with this invention requires very low memory and has very low processing overheads.

The input of the system is the media data stream that comprises of different media types each media type consists of a sequence of samples. The goal of the system is to process the media samples and render them in a synchronous manner for example: audio video should be rendered in a synchronous manner.

According to this invention there is provided method of synchronously processing data streams, each data stream capable of being processed in a single task and wherein each data stream comprises at least one media type, each media type consisting of a sequence of samples, the method comprising the following steps:

a. providing a framework, having there within, a system timer module capable of receiving constant rate timing signals from an operating system and capable of generating a plurality of configured rate timing signals;
  b. creating a task, within the framework, for processing all segments of the data stream, a data stream segment containing whole or the part of the data stream, said data stream segment consisting of at least one sample of each of the said media types;
  c. receiving in the said framework the data stream segment;
  d. creating a session within the said task on receipt of the said data stream segment;
  e. first parsing of the said stream segment to obtain individual media types;
  f. creating within the said session, media time counters linked to each media type and a session time counter for the session;
  g. initializing each of the said time counters to zero;
  h. second parsing of the said stream segment to obtain frame rates for each of the said media types;
  i. converting the frame rates obtained at the second parsing to time slots for each media type;
  j. selecting the largest converted time slot;
  k. registering a request for session timing signals corresponding to the determined largest time slot with the said timer module within the said framework;
  l. generating at a configured rate, session timing signals corresponding to the registered time slot, using constant rate timing signals received within the timer module from the operating system;
  m. receiving within the session a generated configured session timing signal;
  n. acknowledging to the timer module by the session, the receipt of the session timing signal within the session;
  o. incrementing the session time counter by the largest time slot on receipt of the said session timing signal;
  p. receiving within the session a sequence of unprocessed samples of a media type from the said stream segment;
  q. processing the first sample of the said sequence of unprocessed samples;
  r. incrementing, after processing of the sample, the media time counter linked with the media type associated with the said sequence of samples, by the time slot corresponding to the said media type;
  s. comparing the incremented media time counter with the session time counter to determine if the media time counter has exceeded the session time counter;
  t. iterating steps s.p to s.s for the next unprocessed sample in the sequence of samples, for the said media type, if the media timer counter has not exceeded the session time counter;
  u. iterating the process in steps s.p to s.t for the sequence of samples of each of the remaining media types in the said data stream segment;
  v. Iterating the steps s.m to s.u for each of the generated session timing signal till all the samples in the data stream are processed;
  w. deregistering the request for session timing signals with the said timer module;
  x. closing the session; and
  y. closing the task.

In accordance with a preferred embodiment of this invention, the method includes simultaneously processing concurrent and/or disconcurrent data streams.

In accordance with another embodiment of this invention the said configured rate is acceleratable in the event of delayed receipt of acknowledgement.

In accordance with a preferred embodiment of this invention, the method includes a step of monitoring the receipt of the acknowledgment from the session in the timer module and terminating a session if acknowledgment is not received within a pre-determined time interval.

Further, the method includes a step of disabling the ability of the timer module to receive the operating system timing signals in the event of an absence of a session within a framework.

In accordance with another aspect of this invention there is provided a framework for carrying out the method of synchronously processing data stream comprising:

a. a system timer module having a first receiver means for receiving constant rate timing signals from an operating system and a generator means for generating a plurality of configured rate timing signals;
  b. a second receiver means to receive a data stream segment consisting of at least one sample of each media type;
  c. a session manager for creating and closing a session;
  d. a media parser adapted to do the first parsing of a data stream segment to obtain individual media types;
  e. a counter creating means adapted to create session and media time counters;
  f. an initializing means to initialize time counters to zero;
  g. a media data parser adapted to do second parsing of a data stream segment to obtain frame rates for a media type;
  h. a converter means for converting the frame rates to time slots for a media type;
  i. a selecting means for determining the largest time slot;
  j. a registering means in the system timer module for registering or deregistering requests for generating timing signals;
  k. a third receiving means, in session, to receive the session timing signal;
  l. an acknowledging means for acknowledging the receipt of the session timing signals;
  m. an incrementing means adapted to increment the time counters;
  n. a media processor for processing at least one media sample;
  o. a comparator means for comparing the media time counter with the session time counter;
  p. a switching means adapted to switch processing from one media type to another, on receiving a signal from the comparator that media time counter has exceeded the session time counter;
  q. a first iterating means for iterating the processing of the sequence of samples of a media type in the processor;
  r. a second iterating means iterating the processing sequence of samples of the remaining media types; and
  s. a third iterating means iterating the processing of sequence of samples of all the media types for each of the received session timing signals till all the samples in the data stream are processed.

Typically, the framework includes a processor means for simultaneously processing concurrent data streams, and/or disconcurrent data streams Typically, the framework includes an accelerating means for accelerating the configured rate in the event of delayed receipt of acknowledgement.

Typically, the framework includes a monitoring means for monitoring the receipt of the acknowledgment from the session in the timer module.

Typically, the framework includes a terminating means for terminating a session if said acknowledgment is not received within a pre-determined time interval.

Typically, the framework includes a disabling means adapted to disable the ability of the timer module to receive the operating system timing signals in the event of an absence of a session within a framework.

The framework described in this invention comprises the following modules:

System timing module

Session manager

Session

Media parsers

System timing module has the capability of generating configured timing signals by using the constant rate timing signals from operating system.

Session manager received the data stream and creates the task and a session within the task if the resources are available.

Session can parse the media streams to get the media types. Session also invokes the media data parsers to parse the individual media types to get the frame rates. Session has the computing means to convert the frame rates into time slots and to determine the largest time slot. Session registers this time slot with the system-timing module and requests for the timing signals at the periodic interval of the registered time slot. Session also has a counter creator means by which it can create the media counter for each of the media type and session counter.

On receiving the timing signal, session increments the session counter by the registered time slot period and sends an acknowledgement to the system-timing module. Session then processes each media sequentially. The samples of each media are processed sequentially and the media counter is incremented by the corresponding media time slot after each sample is processed. When the media counter exceeds the session counter, the stream switcher switches to next media type. This process is carried out for all the media types in the data stream. The processed samples are immediately rendered.

The above process is carried out until the data stream is over or the process is stopped by external means. When on of this condition occurs the session manager closes the session and the task.

On processor overload condition, the acknowledgement from the session to system timing module gets delayed. In this case the system timing modules accelerates the generation of timing signals to compensate the lag. If the acknowledgement does not arrive in a predetermined period then the system-timing module informs the session manager and the session manager kills the session and the task.

The rate of processing the samples is control by the above algorithm hence in the devices input rate is equal to the output rate that reduces the buffer requirement.

Also all the media types are processed in a single task hence the task switching overheads are minimized in this method.

DETAILED DESCRIPTION OF THE DISCLOSED EMBODIMENTS

The present invention provides methods and apparatus for solving the problems associated with the prior art by providing a unique means for synchronously processing media data streams consisting of at least one media type.

The invention is suitable for processing of multimedia data streams, which requires synchronization between multiple streams or processing of any individual stream at a precise rate.

Figure 3:
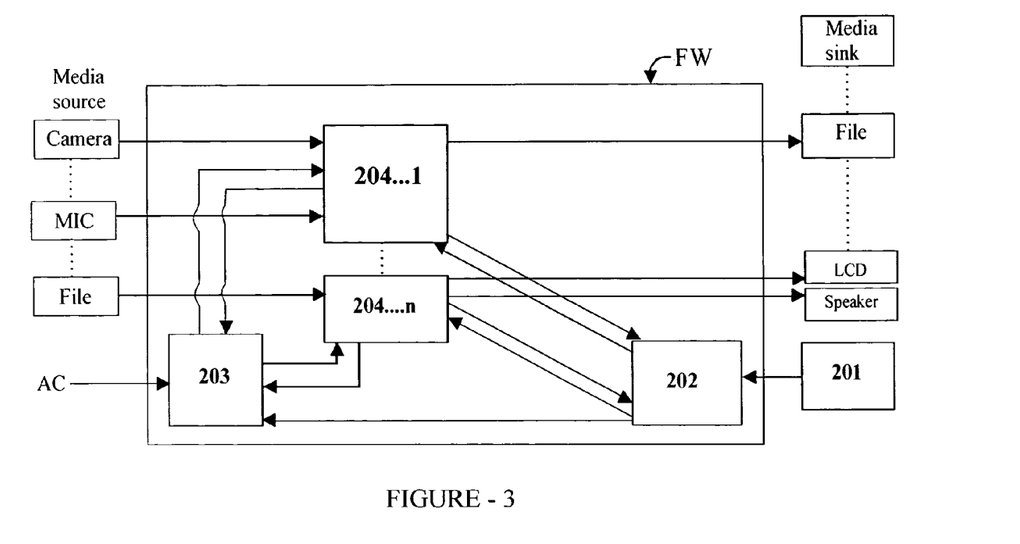
FIG. 3 illustrates the overall interaction in the framework in accordance with this invention.

FIG. 3 shows a media framework system [FW] in accordance with a preferred embodiment of the invention. The media framework takes data streams I/p . . . 1 to I/p . . . n data stream] as an input from media sources such as the storage system or devices like a camera and microphone. The media framework FW performs decompression or compression of the data streams and sends outputs to a storage device or devices like LCD and speaker. Media framework [FW} can reside on computer system or PDAs or mobile devices. The media framework has to process the data stream in a synchronized manner.

In FIG. 3 the modules of the media framework are shown. Block [201] is the operating system timer block, [202] system timing module, block [203] the session manager and blocks [204 . . . 1] to [204 . . . n] are the sessions for each data stream I/p . . . 1 to I/p . . . n, received by the framework FW. The session manager [203] receives application commands [AC]

and input data stream segments. The session manager [203] creates a plurality of sessions [204 . . . 1 to 204 . . . n] as per application commands. Each session takes timing information form the sytem timing module [202] and processes the input data stream. The session sends the processed data streams to the sink components such as the LCD or speaker. The system timing module [202] generates the timing information requested by each session using the operating system timer [201].

Figure 4:
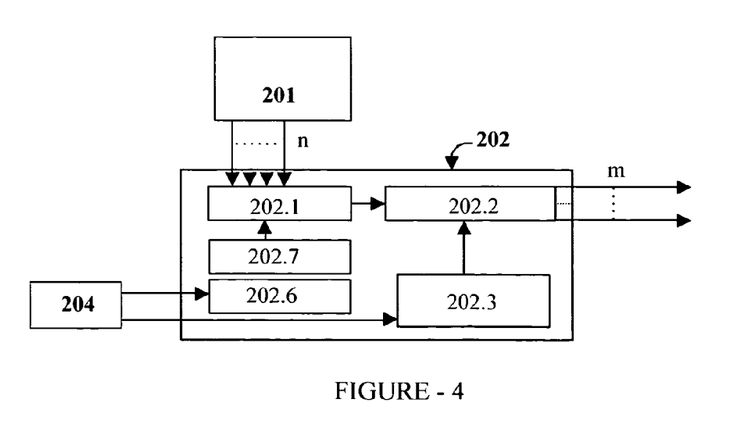
FIG. 4 illustrates a system timing module block diagram functionality of generating configured timing signals for the framework of FIG. 3.

FIG. 4 shows the functionality of block [202], system-timing module in detail. The system timing module has a registering means block [202.3] and deregistering means block [202.6] which a session uses to register and deregister its session timing signal rate requirement. The system timing module consists of the first receiver means [202.1] that receives the constant rate operating system timing signals from block [201], the operating system timer at a regular time interval of 'n' and the generator module [202.2] that generates the configured rate session timing signals for a session at a regular time interval of 'm'. Unlike the cited inventions current method provides session timing signals to all the sessions using only one operating system timer and thus current invention reduces the OS overheads. The system timing module also consists of a disabling means [202.7] which will disable its ability to receive operating system timing signals in the ecvent of an absence of a session within the framework [FW].

Figure 5:
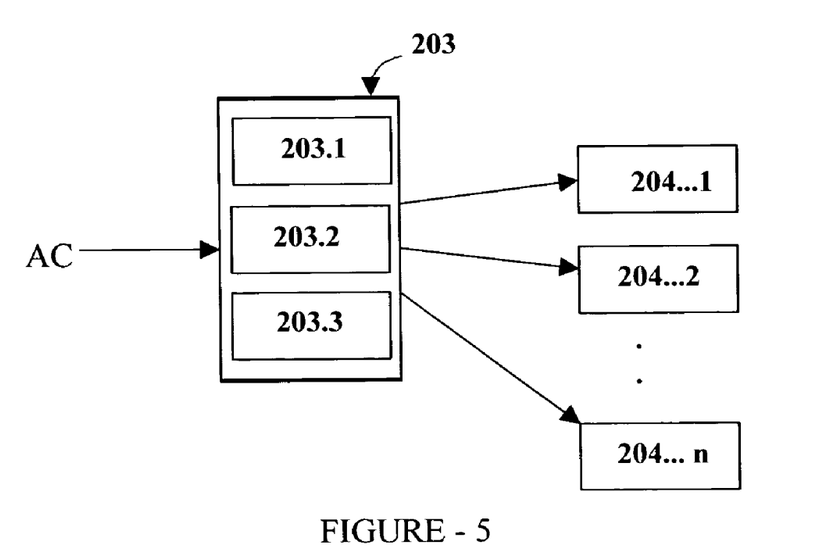
FIG. 5 illustrates the system timing module functionality of creating sessions and closing the sessions for the framework of figure.

FIG. 5 shows the functionality of block [203], the session manager. Session manager has blocks to create a session [203.1] and a block to close a session [203.2] and a block to terminate a session [203.3]. Each session is associated with a task. Session manager also maintains the resource database. This resource database contains information such as on the availability of a device or a codec so as to evaluate whether a session can be created or not. A session is only created if the resource database indicated the availability of a device and codec required.

Figure 6:
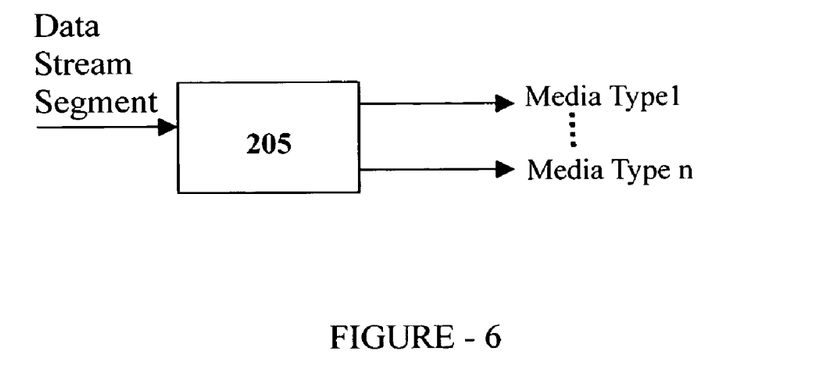
FIG. 6 illustrates the functionality of a media parser block for the framework of FIG. 3 to identify the media types in stream by parsing the input data stream.
Figure 7:
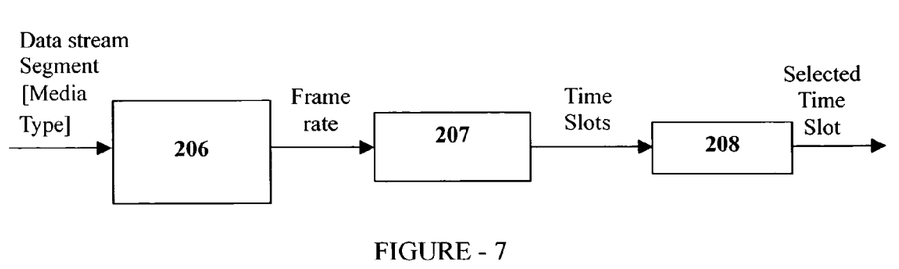
FIG. 7 illustrates the functionality of a media data parser block for the framework of FIG. 3 to parse the media data in order to get the frame rates.
Figure 8:
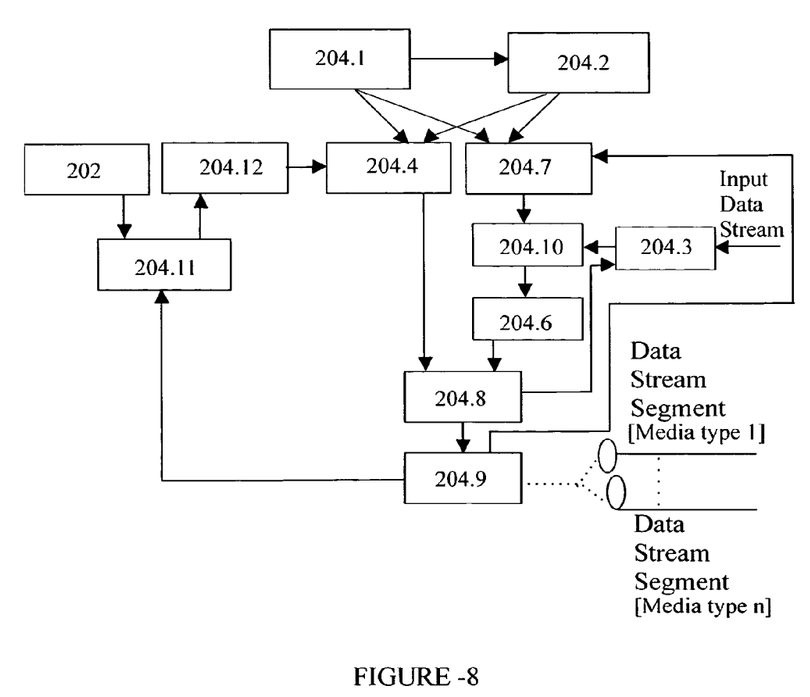
FIG. 8 illustrates the stream switcher functionality block for the framework of FIG. 3 to switch between different media types.

FIG. 6 to FIG. 8 show the modules of block [204], session in detail.

FIG. 6 shows the data stream segment being given to the media parser, block [205], which identifies the media types media type 1 to media type n present in the data stream segment.

In FIG. 7 it is shown that the data stream segments associated with the identified media types are parsed by the second parser, the media data parser, block [206]. The media data parser takes data stream segment associated with each media type as input and parses these to obtain the frame rates corresponding to the data stream segment associated with each media type. Each frame rate is given as an input to the converter, block [207], which converts the frame rate into a time slot corresponding to the time required to process a frame in the data stream segment. The converted time slots are given to the selector, block [208], which selects the largest time slot from all the time slots.

The session [204] now registers a request for session timing signals corresponding to the selected largest time slot with the system timing module [202].

FIG. 8 shows the basic activity performed in the session [204] after having registered its request with the system timing module. The session uses the counter creator [204.1] to create session [204.4] and media time counters [204.7]. The counter initializer [204.2] then initializes these time counters to zero. A sequence of samples in the data stream segment associated with a media type are processed in the media processor [204.10]. The media processor receives as input the unprocessed samples from input data receiver [204.3]. After processing the sequence of samples the media counter corresponding to the media type whose samples have been processed is incremented by the corresponding media time slot in incremented block [204.6]. The comparator shown in block [204.8] compares the media time counter [204.7] with the session time counter [204.4]. If the media time counter has not exceeded the session time counter then the next sample in the sequence will be processed. If the media time counter exceeds the session time counter then the switcher shown in block [204.9] selects the next data stream segment corresponding to the next media type to be processed. The process is repeated till all the media types are processed. The session timing signal receiver [204.11] receives the next session timing signal from the system timer module [202]. The session time counter is incremented in block [204.12]. Now the process is repeated till the input data stream is over or if stopped by an external means. The advantage of such a procedure is that all the media types are processed in a single task so that context switching overheads are reduced.

Figure 9:
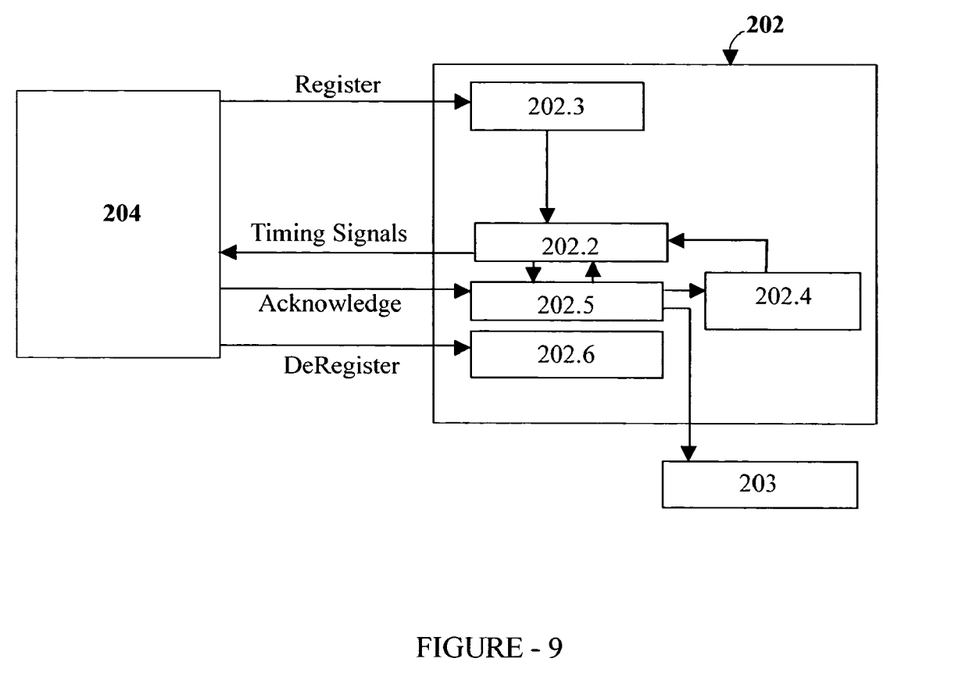
FIG. 9 illustrates a session-system timing module for the framework of FIG. 3 communicating in a normal condition

FIG. 9 shows sessions [204] that interact with the system-timing module [202] and the interaction between the module [202] with the session manager [203]. Session [204] sends a request to the system-timing module [202] for registering the largest time slot and waits for the session timing signals from the system-timing module. System timing module has a register, block [202.3] that registers the request. The system timing module [202] generates the session timing signals at a configured rate by means of the generator shown in block [202.2] and sends them to the session. On receiving the session timing signal, the session sends an acknowlwdgement of the receipt of the session timing signal to the session manager [202.5] and processes the input data stream. The interval between the acknowledgements sent by the session on receiving the session timing signals is monitored by a monitor in system timing module show in block [202.5]. Such a monitoring helps in detecting a lag caused by processor overload as described later. The session timing signals are received and processed periodically until the data stream is over or the process is stopped by an external means. When the stream is over or it is stopped by external means then the session send a deregister request to the system timing module. The deregister means shown in block [202.6] in system timing module accepts the request and stops the session timing signal generation process.

In case of a processor overload, the acknowledgements that are sent to the system-timing module on receiving the session timing signals get delayed. The monitor, block [202.5], compares the period between two acknowledgements with a predetermined warning and error periods. If the acknowledgement period exceeds the warning period then with the accelerator means shown in block [202.4] system timing module accelerates the rate of generation of configured session timing signals. Thus it compensates the previous lag caused by processor overload. When the acknowledgement period exceeds the error period then session manager, shown in block [203] in FIG. 5, is given a message to close the session. Thus if a task is overloading the processor then the task can be terminated and the resources used by the task are recovered.

As shown in FIG. 3, when a session [204 . . . 1] is processing a data stream, the framework can receive other data streams [204 . . . n] concurrently or disconcurrently and can create a new session in a new task for the received data stream. The new data stream can be processed concurrently or disconcurrently in the new task. All the sessions in the framework will use services of same session manager [203] and system manger [202]. Such simultaneous processing of multiple data streams within the same framework was not envisaged by previous cited inventions.

Figure 10:
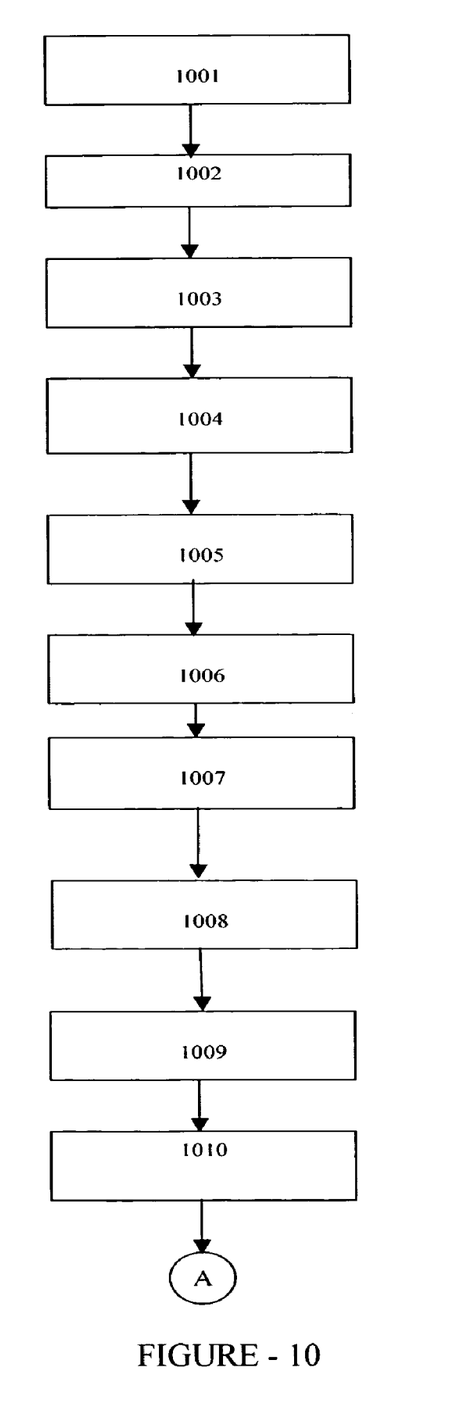
FIG. 10 is a flow diagram for creating and registering a session in the framework of FIG. 3.

The flow diagram in FIG. 10 begins with receiving the application command data stream segment in block [1001]. On receiving a command to create a session required for a data stream segment the session manager creates the task in block [1002] and also creates the session within the task in block [1003].

The session obtains individual media types from the data stream in block [1004], creates media and session time counters in block [1005], initializes the time counters to zero in block [1006]. The frame rate for each media type is obtained by parsing the data stream segment in block [1007], the frame rates are converted to the time slots in block [1008] and the largest time slot is selected in block [1009]. This largest time slot is registered with the system-timing module in block [1010].

Figure 11:
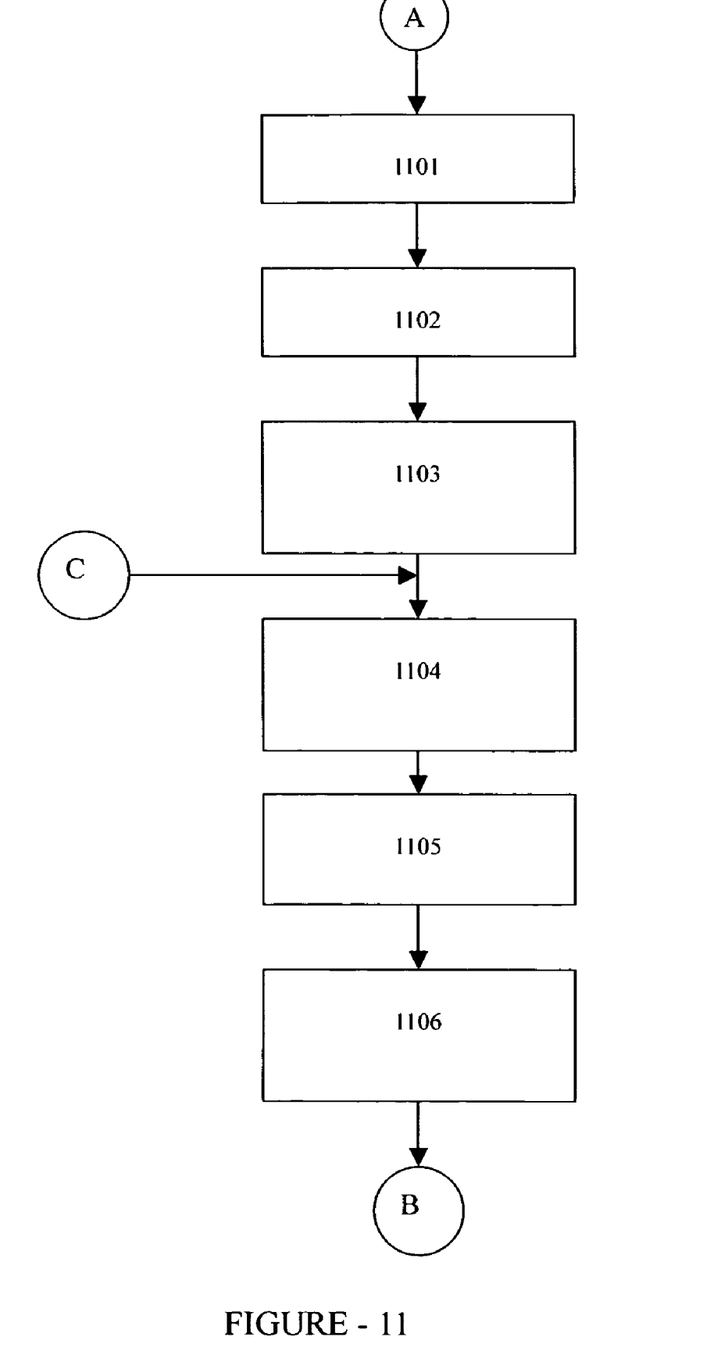
FIG. 11 is a flow diagram after receiving the time signals in the session in the framework of FIG. 3.

The flow diagram in FIG. 11 gives the functionality of the session on receiving the session timing signal from the system-timing module i.e. the connector 'A' in FIGS. 10 and 11. Block [1101] receives the session timing signal and block [1102] acknowledges the session timing signal. Block [1103] represents the activity of incrementing the session counter by the registered time slot.

Block [1104] shows the second receiver means that receives the next unprocessed sample of a media type and [1105] processes the sample. Block [1106] increments the media counter by the corresponding media time slot.

Figure 12:
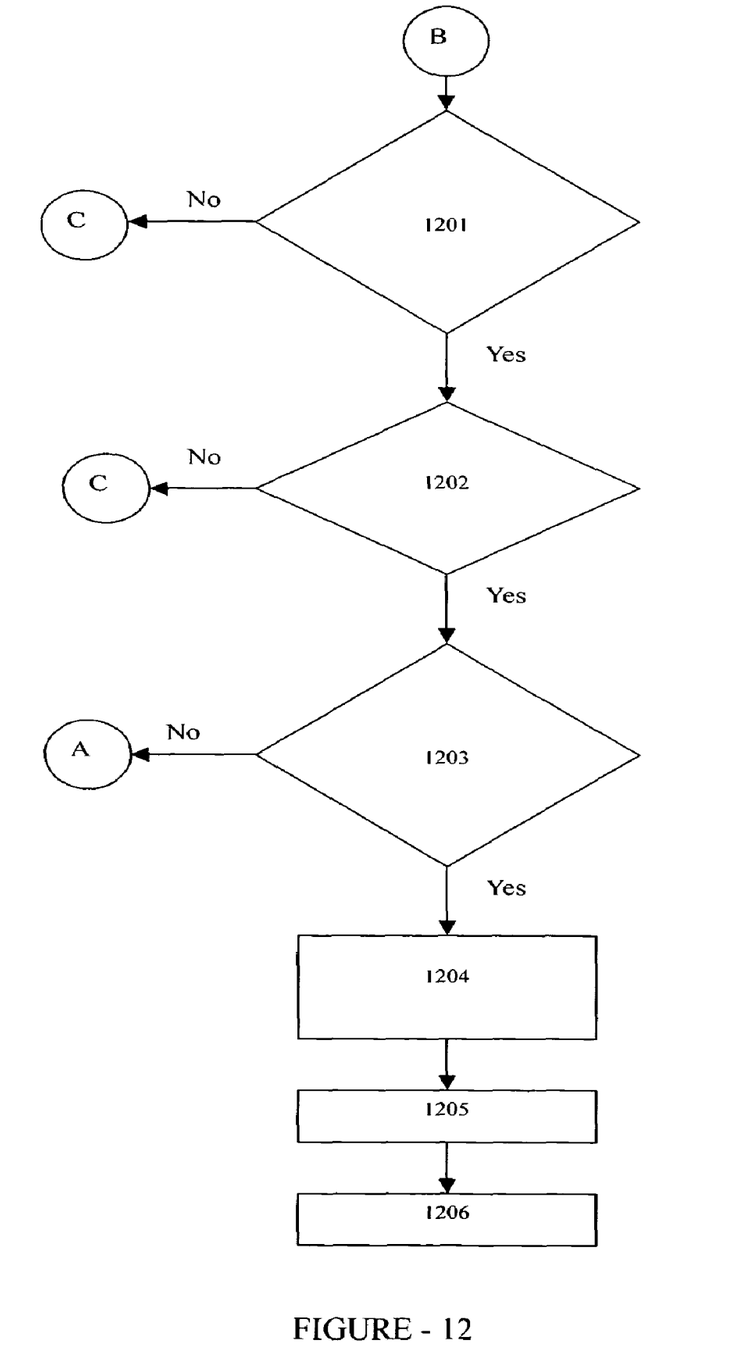
FIG. 12 is a flow diagram for decision mechanism for termination of a session in the framework of FIG. 3.

The decision mechanism for iterating the process from block [1104] to block [1106] for different media types and to check the termination condition is shown in FIG. 12. The session counter is compared with the media time counter in block [1201] and if the condition is false the flow resumes to block [1104] [connector 'C' in FIGS. 12 and 13]. If the condition is true then it is checked if all the media types in the data stream are processed, in block [1202], if not then the process from block [1104] to block [1106] is iterated for the next media type [connector 'C' in FIGS. 11 and 12]. If all the media types are processed then in block [1203] the termination condition is checked. If the data stream is over or the processing is stopped then the flow goes to block [1204] in which session send a request for deregistration to the system-timing module else the flow is resumed to the block [1101] [connector 'A' in FIGS. 11 and 12]. Block [1205] and [1206] show closing of the session and the task respectively.

Figure 13:
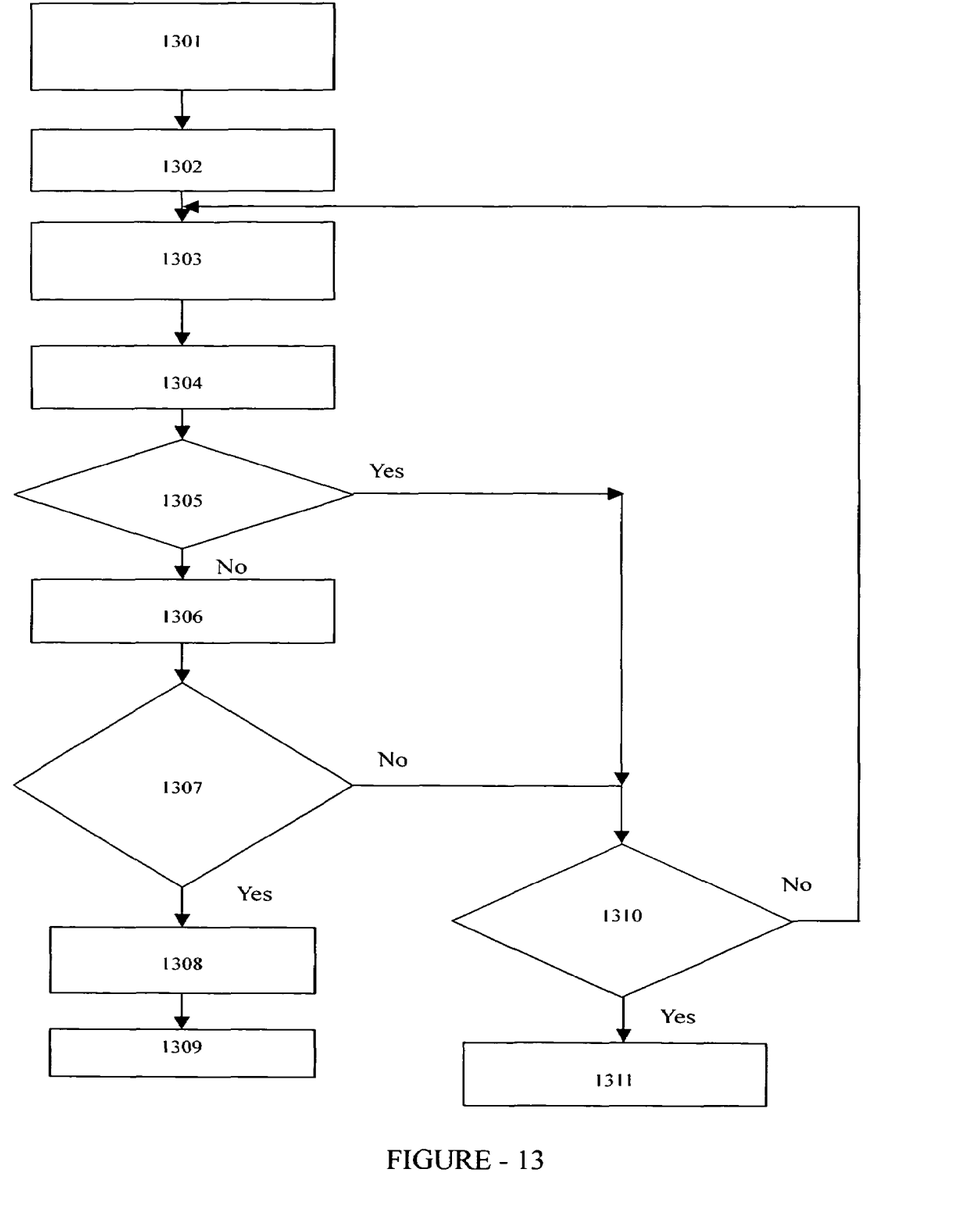
FIG. 13 is the flow diagram of the system timing module in the framework of FIG. 3.

Flow diagram in FIG. 13 shows the flow of the system-timing module in detail. Block [1301] receives the registration request from the session. Block [1302] receives the constant rate operating system timing signals, which are used by Block [1303] to generate the configured rate signals. Block [1304] waits for a receipt of session timing signal from the session and receives it. Block [1305] checks if the receipt of the session timing signal is arrived from the session at expected time. If the receipt is received in time then the process from block [1302] to block [1304] is iterated until the condition in block [1310], becomes false. Block [1310] checks if the deregister request is received by the system-timing module from session. If the deregister signal is received then the process of the session timing signal generation is stopped in block [1311]. If the receipt is not received in time then the session timing signal generation rate is accelerated in block [1306]. The condition whether the receipt is not received in predetermined error period is checked in block [1307]. If the condition is true then an error message is posted to session manager in block [1308] and the session is closed in block [1309] else the flow is redirected to the block [1310].

The invention claimed is:

1. A method, comprising:
   receiving a data stream segment;
   creating a session within a single task on receipt of the data stream seqment;
   first parsing the data stream segment to obtain a plurality of different media types included in the data stream segment;
   creating media time counters linked to each of the media types and a session time counter for the session;
   initializing each of the media time counters and the session time counter;
   second parsing of the data stream segment to obtain flame rates for each of the media types;
   converting the frame rates to time slots for each of the media types;
   selecting a largest one of the converted time slots;
   generating, at a configured rate, session timing signals corresponding to the largest one of the converted time slots, using constant rate timing signals
   incrementing the session time counter by the largest time slot on receipt of one of the session timing signals; and
   processing a sequence of unprocessed samples of each of the different media types in the data stream segment, wherein for each of the sequences of unprocessed samples, the processing includes:
   processing each sample of the sequence of unprocessed samples, and
   incrementing, after the processing of each sample, the media time counter linked with the media type associated with the sequence of unprocessed samples, by the time slot corresponding to the media type, wherein each sample of the sequence of unprocessed samples is processed until.

2. A method as claimed in claim 1 which includes simultaneously processing concurrent data streams.

3. A method as claimed in claim 1 which includes simultaneously processing disconcurrent data streams.

4. A method as claimed in claim 1 in which the configured rate is acceleratable in the event of delayed receipt of an acknowledgement of receipt of a generated configured session timing signal.

5. A method as claimed in claim 4 further comprising monitoring for receipt of the acknowledgment and terminating the session if the acknowledgment is not received within a pre-determined time interval.

6. A method as claimed in claim 1 further comprising disabling an ability to receive constant rate timing signals from an operating system in an event of an absence of the session.

7. A system comprising:
   a first receiver means for receiving a data stream segment consisting of at least one sample of a plurality of different media types;
   a session manager means for creating a session within a single task on receipt of the data stream segment;
   a media parser means for doing a first parsing of the data stream segment to obtain the different media types included in the data stream segment;
   a counter creating means for creating a session time counter for the session and media time counters linked to each of the media types;
   an initializing means for initializing the session time counter and the media time counters;
   a media data parser means for doing a second parsing of the data stream segment to obtain frame rates for each of the media types;

a converter means for converting the frame rates to time slots for each of the media types;

a selecting means for selecting a largest one of the converted time slots;

a second receiving means, in the session, for receiving a session timing signal;

an incrementing means for incrementing the session time counter and the media time counters;

a media processor means for processing at least one media sample of at least one of the different media types;

a comparator means for comparing the media time counter linked to the at least one media type with the session time counter;

a switching means for switching processing from one of the different media types to another, on receiving a signal from the comparator means that the media time counter has exceeded the session time counter;

a first iterating means for iterating processing of a sequence of samples of one of the different media types;

a second iterating means for iterating processing of a sequence of the samples of each remaining one of the different media types; and a third iterating means for iterating the processing of the sequence of the samples of all the media types for each received session timing signal until all the samples in the data stream are processed.

8. A system of claim 7 comprising a processor means for simultaneously processing concurrent data streams and disconcurrent data streams.

9. A system of claim 7 comprising an accelerating means for accelerating configured rate timing signals in an event of delayed receipt of an acknowledgment of receipt of the session timing signal.

10. A system of claim 9 comprising a monitoring means for monitoring receipt of the acknowledgment from the session.

11. A system of claim 9 comprising a terminating means for terminating the session if the acknowledgment is not received within a predetermined time interval.

12. A system of claim 7 comprising a disabling means for disabling an to receive timing signals from an operating system in an event of an absence of the session.

* * * * *

UNITED STATES PATENT AND TRADEMARK OFFICE
CERTIFICATE OF CORRECTION

PATENT NO. : 7,539,218 B2
APPLICATION NO. : 11/070747
DATED : May 26, 2009
INVENTOR(S) : Panvalkar et al.

It is certified that error appears in the above-identified patent and that said Letters Patent is hereby corrected as shown below:

Col. 10, line 5, replace "seqment;" with -- segment; --;
Col. 10, line 13, replace "flame" with -- frame --;
Col. 10, line 34, replace "until." with -- until the media time counter has exceeded the session time counter. --;
Col. 10, line 41, replace "acknowledgement" with -- acknowledgment --;
Col. 12, line 18, replace "an to" with -- an ability to --.

Signed and Sealed this
Fourth Day of October, 2011

David J. Kappos
*Director of the United States Patent and Trademark Office*